United States Patent [19]

Eisenberg et al.

[11] Patent Number: 4,722,024

[45] Date of Patent: Jan. 26, 1988

[54] DEVICE FOR DETECTING EXCESS-CURRENT IN A DIRECT-CURRENT GENERATOR WITH CONTROLLED RECTIFIER

[75] Inventors: Wilfried Eisenberg; Edmund Zok, both of Remscheid, Fed. Rep. of Germany

[73] Assignee: AEG-Elotherm GmbH, Remscheid-Hasten, Fed. Rep. of Germany

[21] Appl. No.: 54,055

[22] Filed: May 26, 1987

Related U.S. Application Data

[63] Continuation of Ser. No. 695,828, Jan. 28, 1985, abandoned.

[30] Foreign Application Priority Data

Jan. 28, 1984 [DE] Fed. Rep. of Germany ....... 3402954

[51] Int. Cl.$^4$ ............................................... H02H 3/08
[52] U.S. Cl. ..................................... 361/95; 361/100; 361/87
[58] Field of Search ..................... 361/87, 93, 95, 100, 361/101; 323/281; 363/85, 86, 87

[56] References Cited

U.S. PATENT DOCUMENTS

| | | | |
|---|---|---|---|
| 3,743,887 | 7/1973 | Keough et al. | 361/93 X |
| 3,895,263 | 7/1975 | Clark | 361/93 X |
| 4,127,895 | 11/1978 | Krueger | 363/86 |
| 4,297,741 | 10/1981 | Howell | 361/93 |
| 4,309,735 | 1/1982 | Morris | 361/100 |
| 4,346,423 | 8/1982 | Matthes et al. | 361/87 |

Primary Examiner—A. D. Pellinen
Assistant Examiner—Derek S. Jennings
Attorney, Agent, or Firm—Cushman, Darby & Cushman

[57] ABSTRACT

The apparatus relates to an excess-current monitoring device in a direct-current generator having a controlled rectifier, and is particularly useful for electro-chemical machining. A reference signal is generated by a signal generator in accordance with the voltage drive of the rectifier and the mean current supplied to the load. The reference signal is supplied to a comparator which supplies a current-switch-off-signal when the value of the reference signal as compared to the instantaneous load current indicates excess mean load current. This enables optimum machining.

5 Claims, 3 Drawing Figures

DEVICE FOR DETECTING EXCESS-CURRENT IN A DIRECT-CURRENT GENERATOR WITH CONTROLLED RECTIFIER

This is a continuation of application Ser. No. 695,828, filed Jan. 28, 1985, which was abandoned upon the filing hereof.

BACKGROUND OF THE INVENTION

Field of the Invention

The invention relates to a device for monitoring the current, supplied to a load from an alternating-current and particularly three-phase network via a controlled rectifier, comprising measurement transformers for detecting the current, a signal generator for generating a reference value for the current and a comparator which supplies a switching-off signal when the current to be monitored exceeds the predetermined reference value of the signal generator.

Discussion of Prior Art

Such known devices (German Offenlegungsschrift No. 3,032,757) are used, for example, in electro-chemical machining (i.e. ECM). The current supplied by the rectifier to the resistive to resistive-inductive load can have a varying ripple percentage with the same arithmetic mean value, depending on operating parameters (for example operating voltage, operating gap size). However, since the arithmetic mean is determining for the loading of the electrode and the result of the work, it is important to take this arithmetic mean into consideration when switching off. But the calculation of the arithmetic mean by integrating the instantaneous values entails a delay until switching-off is possible, which delay can have a negative effect with regard to the risk of damaging the electrode and the quality of machining. For this reason, the maximum values of the operating current suitable for a permissible arithmetic mean of the current have hitherto been determined experimentally for certain operating parameters. But if the operating parameters change, these maximum values determined no longer correspond to the arithmetic mean value of the current which would be optimum for these changed operating parameters.

SUMMARY OF THE INVENTION

The invention has the basic objective of improving the device of the type initially mentioned so that, in order to protect the load, the current supply to the load is very rapidly switched off when a predetermined arithmetic mean of the current supplied to the load is reached, independently of any change in operating parameters.

According to the invention, this objective is achieved by that the signal generator generates the predetermined reference value in accordance with a characteristic curve for the relationship of the shape of the current supplied to the load to the control of the rectifier.

In the invention, the rectifier is switched off in dependence on the instantaneous value of the current supplied to the load, taking into consideration the current shape determining for the arithmetic mean. The invention is based on the finding that, on the one hand, the shape of the current supplied to the load depends on the output voltage of the rectifier and, on the other hand, the output voltage of the rectifier depends on the control voltage of the rectifier control set. These interrelationships result in a characteristic curve for the current shape and the drive of the rectifier. Utilizing this characteristic curve in the signal generator for the reference signal to be supplied to the comparator ensures that, with identical set arithmetic mean but different current shape, the switching-off always takes place at a certain level relative to the arithmetic mean, as a function of the instantaneous value. In other words: the switching-off point is dynamically matched to the respective current shape.

If several loads are provided, a comparator is provided for each. If the loads differ from each other, the output of the signal generator should be connected to the respective comparator via a correction section which can be used for adjusting the level of the reference value. This design of the invention makes it possible to set different arithmetic means for the various loads.

DESCRIPTION OF AN EMBODIMENT OF THE INVENTION

DETAILED DESCRIPTION OF THE EMBODIMENT OF THE INVENTION

Figure 1:
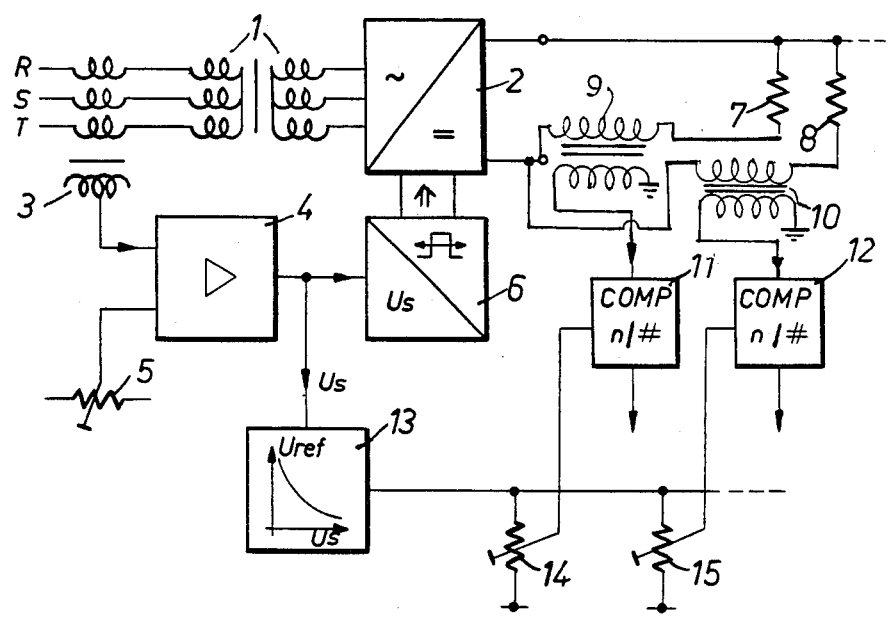
FIG. 1 shows a circuit diagram of the device.

According to the circuit diagram of FIG. 1, current is supplied to a load from a three-phase network R, S, T via a transformer 1, a full-wave rectifier 2 and a controlled set of thyristors. The current supplied is detected with measurement transformers 3 on the primary side of the transformer 1 and fed as an actual value to a regulator 4. The nominal value fed to the regulator 4 can be set on a potentiometer 5. The regulator 4 supplies an adjusting signal to a control unit 6 which supplies control pulses to the thyristors of the rectifier 2. The firing time of the thyristors is determined by the phase relationship of the pulses with respect to the phase relationship of the three-phase network. This makes it possible to control the output voltage of the rectifier 2. At the output of the rectifier 2, one or several consumers, in an ECM system resistive to resistive-inductive consumers 7, 8, are connected. The current supplied to the consumers 7, 8, is detected via measurement transformers 9, 10 and supplied to a comparator 11, 12 which is associated with the respective consumer 7, 8. If the actual value supplied by the transformers 9, 10 to the comparators 11, 12 exceeds the reference value supplied to another input and generated in a manner still to be described, the comparator 11, 12 provides a signal for switching off the rectifier. Switching off can occur by the control unit 6 supplying no further control pulses to the rectifier 2. However, other possibilities of switching off are also conceivable.

Figure 2:
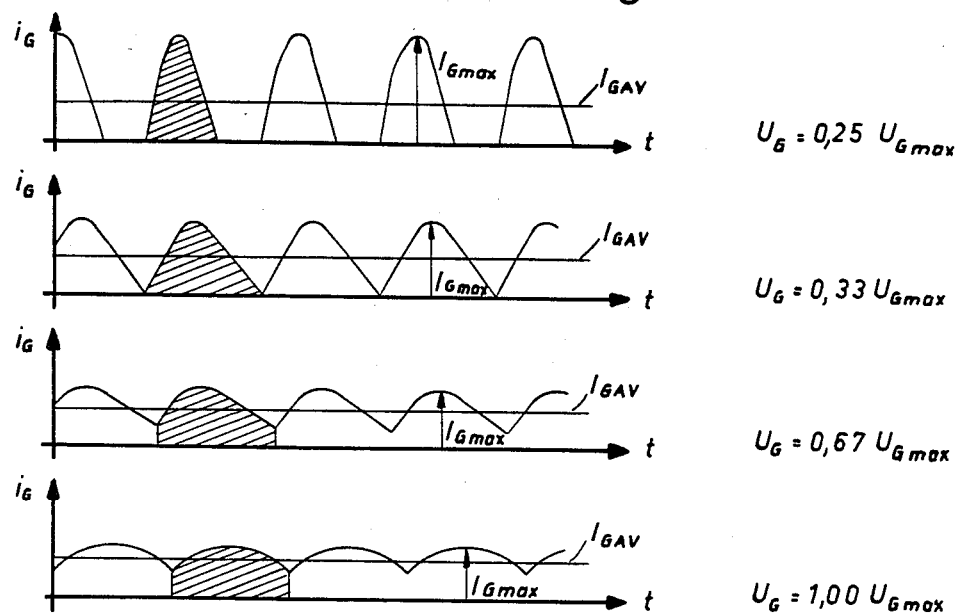
FIGS. 2A-2D shows a diagram with various shapes of the current supplied by the rectifier, this current having identical arithmetic means.
Figure 3:
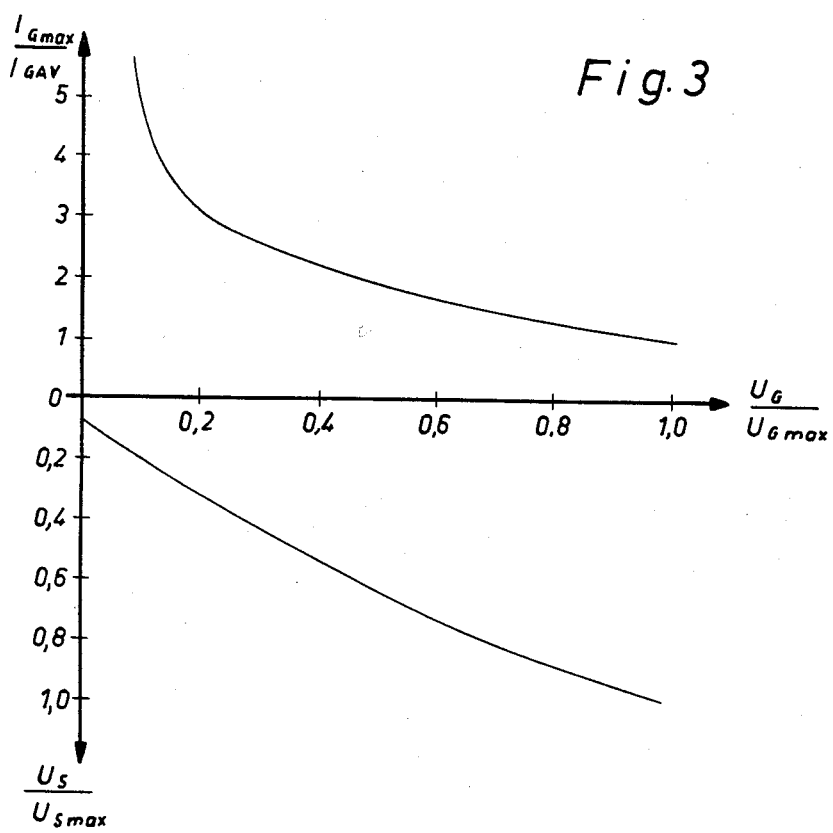
FIG. 3 shows a diagram for the relationship between the peak value of a direct current ($I_{Gmax}$), supplied to a resistive to resistive-inductive load, normalized to the arithmetic mean of this current ($I_{GAV}$), and the output voltage of the rectifier ($U_G$), normalized to the maximum output voltage of the rectifier ($U_{Gmax}$), and a diagram for the relationship between the output voltage of the rectifier ($U_G$), normalized to the maximum output voltage of the rectifier ($U_{Gmax}$), and the control voltage of the rectifier ($U_S$), normalized to the maximum control voltage of the rectifier ($U_{Smax}$).

According to the invention, the reference signals supplied to the comparators 11, 12 are generated by a signal generator 13 which obtains from the regulator 4 a control voltage $U_S$ which is also supplied to the control unit 6 for the drive of the rectifier 2. This signal generator 13 comprises, for example, a computer in which a characteristic curve is reproduced which contains the relationship of the shape of the current supplied by the rectifier 2 to the control voltage of the rectifier 2. This relationship is represented in the diagram of FIG. 3. According to this diagram, the reference voltage $U_{ref}$ supplied by the signal generator 13 to the comparators 11, 12 is non-linearly related to the control voltage $U_S$. The diagrams of FIGS. 2 and 3 show that for a large control voltage, the peak value of the current deviates only a little from the arithmetic mean of the current (see lower diagram in FIG. 2), while for a small drive of the rectifier 2, the peak value of the current deviates greatly from the arithmetic mean of the current (see upper current diagram in FIG. 2). In order to be able to adjust the maximum current loading, which differs for the individual loads, individually with several parallel loads 7, 8, the reference voltage supplied by the signal generator 13 is not supplied directly to the comparators 11, 12 but via adjustable voltage dividers 14, 15.

The device described operates in the following manner:

As in known devices, the regulator 4 supplies, as a function of a comparison of the nominal and actual value of the current fed into the transformer 1, an adjusting signal to the control unit 6 which supplies control pulses to the gate electrodes of the thyristors of the rectifier 2. The thyristors fire earlier or later in dependence on the phase relationship of the pulses with respect to the phase relationship of the voltage applied to the individual thyristors. The current shapes shown in FIG. 2 are produced as a function of this drive.

But as already mentioned, it is not the maximum value of the operating current which is determining for the loading of the electrode and the result of the work but the arithmetic mean of the operating current. However, since this mean for the operating current supplied to the load cannot be determined directly instantaneously but only by integration over several periods, such an arithmetic mean cannot be utilized as information on whether the value of the operating current supplied to the load will not lead to an overloading of the load. In order to protect the load from dangerous excessive current, nevertheless, by immediately switching off the operating current, the instantaneous operating current is compared in the invention with a value which is a function of the current shape of the operating current and which is a measure of the arithmetic mean of the operating current. This happens in such a manner that the comparator 11, 12 for comparing the instantaneous values, determined in the measurement transformers 9, 10, of the operating current is biased with reference values which depend on the control voltage $U_g$ as the current shape of the operating current. The non-linear relationship between the current shape of the operating current and the drive of the rectifier 2 via the control unit 6 of the control voltage $U_S$ is taken into consideration for the reference values by means of the control unit 6 with a characteristic curve, experimentally determined, in the signal generator 13 supplying the reference signals. With full drive, that is to say for the current shape shown in the lower current diagram in FIG. 2, the level of the voltage $U_S$ for the comparators 11, 12 is lower than with less drive, for example for the current shape shown in the upper diagram in FIG. 2. This ensures that, independently of the current shape and taking into consideration the arithmetic mean of the operating current, the comparators 11, 12 are capable of reacting very rapidly to a sudden rise in current in the load without the necessity of first determining the arithmetic mean by calculation.

What is claimed is:

1. An apparatus for monitoring and switching off the current delivered to a load comprising:
   AC-DC transformer means for receiving an AC current input and delivering DC load current;
   controlling means for receiving an AC-input current signal proportional to the AC current input received by said AC-DC transformer means and for generating a corresponding control signal for controlling said AC-DC transformer means;
   signal generator means for receiving said control signal and generating therefrom a reference signal in accordance with preset characteristic curves relating the shape of the load current to said control signal; and
   comparison means for comparing instantaneous load current and said reference signal and generating a switch-off signal to said AC-DC transformer means, such that the load current is switched off when said comparison means determines that the instantaneous load current exceeds said reference signal.

2. Apparatus according to claim 1 further including at least one load connected to said AC-DC transformer means.

3. Apparatus according to claim 2 wherein said comparison means further includes correction means for receiving the reference signal from said signal generator means, and adjusting said reference signal thereby permitting the at least one load to be operated below maximum loading.

4. The apparatus according to claim 3 wherein said AC-DC transformer means includes means for receiving current from a three phase network.

5. The apparatus according to claim 4 wherein said AC-DC transformer means includes a three phase network and said network is connected to said means for receiving current.

* * * * *